United States Patent
Ito

(10) Patent No.: US 8,416,497 B2
(45) Date of Patent: Apr. 9, 2013

(54) LENS ARRAY UNIT, OPTICAL HEAD AND INFORMATION APPARATUS

(75) Inventor: Katsuyuki Ito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 12/591,477

(22) Filed: Nov. 20, 2009

(65) Prior Publication Data

US 2010/0134894 A1 Jun. 3, 2010

(30) Foreign Application Priority Data

Nov. 28, 2008 (JP) .................................. 2008-304115

(51) Int. Cl.
*G02B 27/10* (2006.01)
*G03B 21/60* (2006.01)

(52) U.S. Cl.
USPC .......................................... 359/618; 359/455

(58) Field of Classification Search .......... 359/618–621, 359/625–626, 443, 454–455; 264/1.1, 1.32, 264/2.7
See application file for complete search history.

(56) References Cited

U.S. PATENT DOCUMENTS

| 4,611,124 | A | * | 9/1986 | Schneider | 250/208.1 |
| 6,693,748 | B1 | * | 2/2004 | Fujimoto et al. | 359/621 |
| 7,274,514 | B2 | * | 9/2007 | Uematsu | 359/654 |
| 2002/0124378 | A1 | * | 9/2002 | Nemoto et al. | 29/450 |
| 2003/0081312 | A1 | * | 5/2003 | Nemoto et al. | 359/454 |
| 2006/0056034 | A1 | * | 3/2006 | Tsuruma | 359/626 |
| 2008/0186572 | A1 | * | 8/2008 | Tomikawa et al. | 359/462 |
| 2010/0315718 | A1 | * | 12/2010 | Nagata | 359/622 |

FOREIGN PATENT DOCUMENTS

JP 2000-221445 A 8/2000

* cited by examiner

*Primary Examiner* — Dawayne A Pinkney
(74) *Attorney, Agent, or Firm* — Rabin & Berdo, P.C.

(57) ABSTRACT

A lens array unit focuses the light emitted from light emitting elements on the photoconductive drum. A longitudinally extending lens array includes a plurality of lenses and projections. The lenses are aligned in a row substantially perpendicular to optical axes of the lenses. The projections are disposed on both sides of the row, and extend outwardly further than the lens surfaces to protect the lens surfaces of the plurality of lenses. A light shielding member includes a mounting portion that holds the lens plate and a light shielding portion that shields part light passing through the lenses.

20 Claims, 3 Drawing Sheets

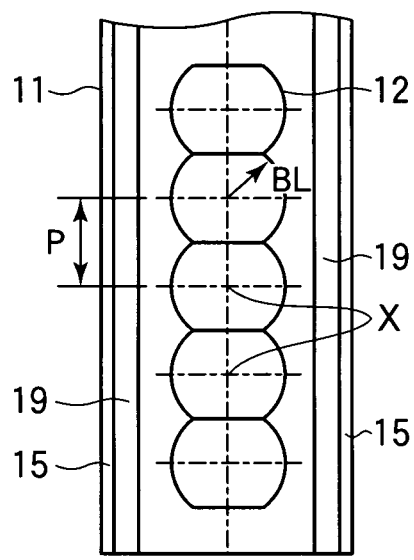
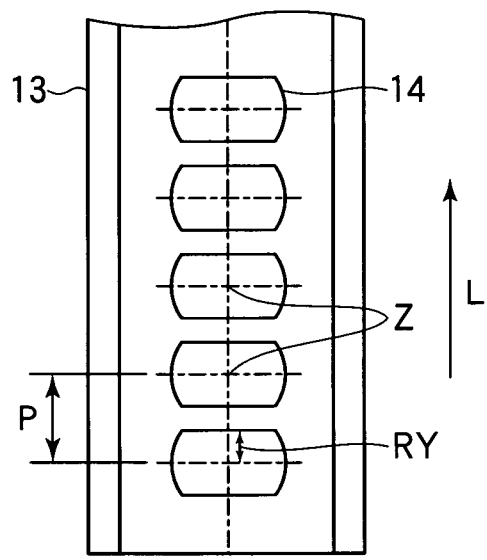
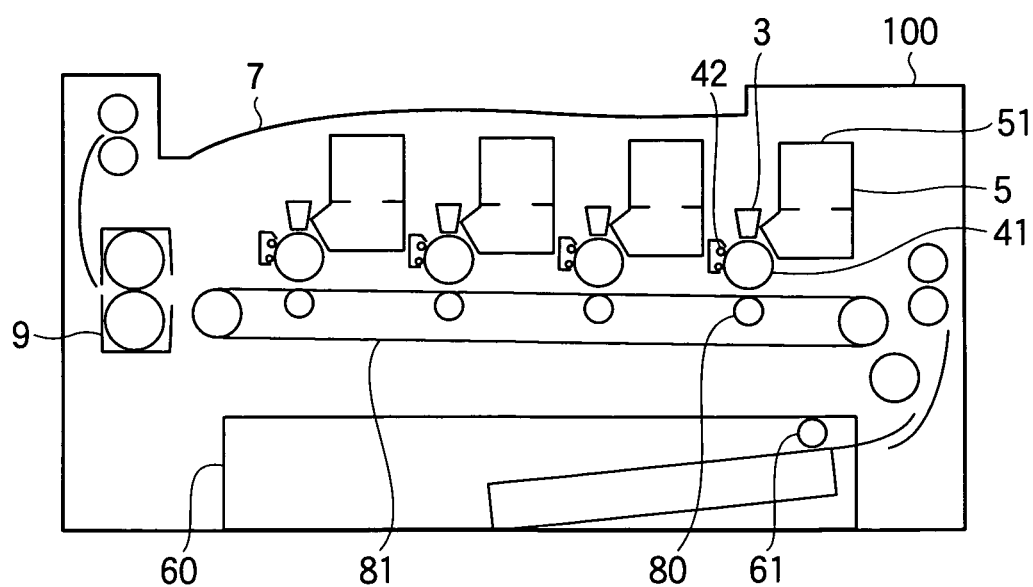

LENS ARRAY UNIT, OPTICAL HEAD AND INFORMATION APPARATUS

BACKGROUND OF THE INVENTION

1. Field of the Invention

The present invention relates to a lens array unit which may be used as an optical system for an optical reading apparatus or an LED head for an image forming apparatus, an optical head that incorporates the lens array unit, and an information apparatus that incorporates the optical head.

2. Description of the Related Art

Electrophotographic image forming apparatuses employ an LED head in which a plurality of light emitting diodes (LEDs) is aligned in a line. Likewise, scanners and facsimile machines employ an optical reading device in which light receiving elements are aligned in a line. Conventional LED heads and optical reading devices employ a rod lens array, which is an optical system capable of forming erect images of the same size as objects aligned in a line.

Some optical systems include two lens arrays each of which includes microlenses aligned straight, and form an erect image of an object. The lens arrays may be efficiently manufactured by plastic injection molding with very high shape accuracy, thereby providing high image resolution.

One problem with the aforementioned prior art optical systems is that microlenses make the entire surface of the lens array uneven and therefore it is difficult to remove dirt and stains deposited on the lens surfaces. Another problem is that the lenses are molded from a resin material and therefore the lens surfaces are sensitive to scratch.

SUMMARY OF THE INVENTION

An object of the invention is to solve the aforementioned prior art problems and to provide a lens array unit in which the lens surfaces are protected from scratch.

A lens array unit includes a longitudinally extending lens array, protective projections, and a light shielding member. The lens array includes a plurality of lenses aligned in a row substantially perpendicular to optical axes of the lenses. The projections are disposed on both sides of the row, the projections protecting lens surfaces of the plurality of lenses. The projections extend in a direction parallel to the longitudinally extending lens array unit, and extends further than the lens surfaces in directions substantially parallel to the optical axes. The light shielding member includes a mounting portion that holds the lens plate in position.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 1A is a top view of a lens plate of a first embodiment;
FIG. 1B is a top view of a light shielding member;
FIG. 2 illustrates a general configuration of an image forming apparatus of the invention.

DETAILED DESCRIPTION OF THE INVENTION

Figure 3:
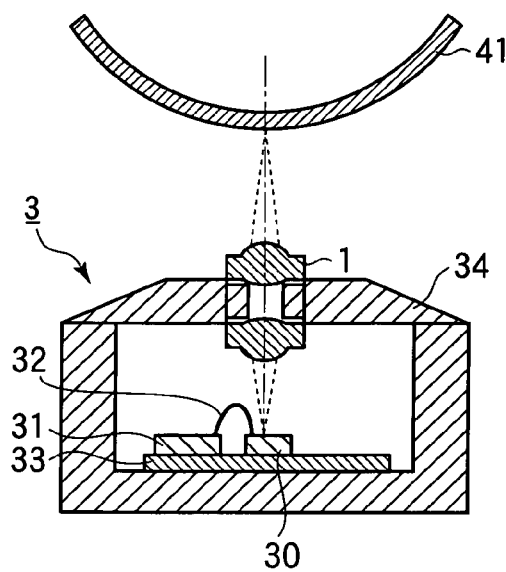
FIG. 3 is a cross-sectional view of an LED head of the invention.

Embodiments of the present invention will be described in detail with reference to the accompanying drawings.
First Embodiment
{Configuration}
FIG. 2 illustrates a general configuration of an image forming apparatus of the invention. The image forming apparatus of the invention or a printer 100 will be described in detail with reference to FIG. 2. Referring to FIG. 2, the printer 100 forms an image on a print medium or paper 101 in accordance with image data, by using a developer material or toner formed of a resin and a pigment. A paper cassette 60 holds a stack of the paper 101. A feed roller 61 feeds the top sheet of the stack of the paper 101 into a transport path.

The printer 100 is an electrophotographic color printer. Four print engines are aligned in tandem along the transport path of the paper 101. Each print engine includes a photoconductive drum 41, a developing section 5, and a toner cartridge 51. An electrostatic latent image of a corresponding one of yellow, magenta, cyan, and black is formed on the photoconductive drum 41. The toner cartridge 51 holds the toner of a corresponding color. The developing section 5 supplies the toner of a corresponding color to the electrostatic latent image, thereby developing the electrostatic latent image into a toner image.

Each photoconductive drum 41 is surrounded by a charging roller 42, an exposing unit or an LED head 3, and a transfer roller 80. The charging roller 42 rotates in contact with the photoconductive drum 41 to uniformly charge the circumferential surface of the photoconductive drum 41. The LED head 3 selectively illuminates the charged surface of the photoconductive drum 41 in accordance with the image data to form an electrostatic latent image. The transfer roller 80 is disposed to face the photoconductive drum 41 with a transfer belt 81 sandwiched between the photoconductive drum 41 and the transfer roller 80, thereby defining a transfer point between the photoconductive drum 41 and the transfer belt 81. When the paper 101 carried on the transfer belt 81 passes through the transfer point, the toner image is transferred from the photoconductive drum 41 onto the paper 101. A fixing section 9 is disposed downstream of the print engines where the toner image on the paper 101 is fixed by heat and pressure. The paper 101 is then discharged to a stacker 7 after fixing.

The charging roller 42 and transfer roller 80 receive predetermined high voltages from corresponding power supplies (not shown). The transfer belt 81, photoconductive drum 41 and associated rollers are driven in rotation by corresponding motors (not shown) via gear trains. The developing section 5, LED head 3, fixing section 9, and the respective motors (not shown) are connected to corresponding power supplies and controllers.

The printer 100 includes an external interface through which the print data is received from an external apparatus, and forms an image in accordance with the print data. The printer 100 of the aforementioned configuration also includes a memory that stores control programs and a controller that performs the overall control of the printer based on the control programs.

FIG. 3 is a cross-sectional view of the LED head 3 of the invention. The configuration of the LED head 3 will be described with reference to FIG. 3. The LED head 3 includes a lens array unit 1, which is securely assembled to the LED head 3 by means of a holder 34. LEDs 30 and driver ICs 31 are disposed on a printed circuit board 33, and are electrically connected to each other by means of wires 32 such that the LEDs 30 are controllably driven by the driver ICs 31 to emit light.

The lens array unit 1 focuses the image of the LEDs 30 on the surface of the photoconductive drum 41. As the photoconductive drum 41 rotates, the LEDs 30 are selectively driven to emit light, which in turn illuminates the charged surface of the photoconductive drum 41 to form an electrostatic latent image. The LED head 3 has a resolution of 600 dots per inch (dpi), i.e., 600 LEDs per inch (i.e., 25.4 mm). In other words, LEDs are aligned at intervals of 0.0423 mm.

Figure 4:
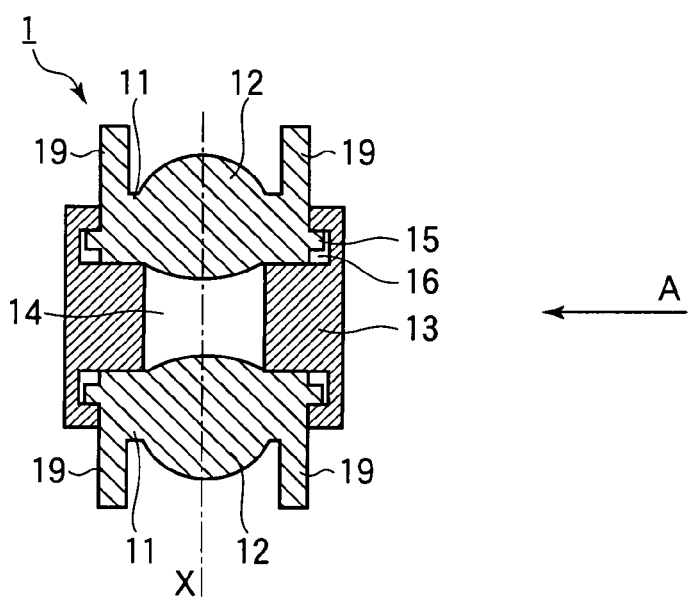
FIG. 4 is a cross-sectional view of a lens array unit.
Figure 5:
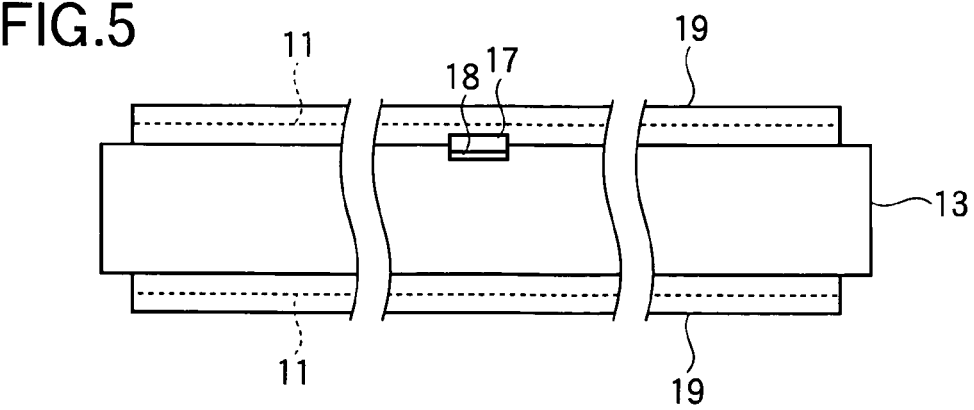
FIG. 5 is a side view of the lens array unit as seen in a direction shown by arrow A.

The configuration of the lens array unit 1 will be described with reference to FIGS. 1A and 1B, 4, and 5. FIG. 1A is a top view of a lens plate 11 and FIG. 1B is a top view of a light shielding member 13. FIG. 4 is a cross-sectional view of the lens array unit 1. FIG. 5 is a side view of the lens array unit 1 as seen in a direction shown by arrow A.

Referring to FIG. 1A, the lens plate 11 includes a plurality of microlenses 12. Each of the microlenses 12 includes a light exiting surface and a light entering surface. The light exiting surface has a smaller radius of curvature than the light entering surface. The microlenses 12 are aligned in a direction perpendicular to the optical axes of the microlenses 12 such that the center-to-center distance between adjacent microlenses 12 is equal to P. Each microlens 12 has a lens surface with a circumferential perimeter of a radius. RL larger than a distance P/2, partially cut away in a plane parallel the optical axis. Protective projections 19 are formed to extend in a direction parallel to the optical axes further than the lens surfaces of corresponding microlenses 12.

The projections 19 prevent a user from directly touching the convex lens surfaces, thereby protecting the lens surfaces from scratch or inadvertent touching. The projections 19 are plate-shaped but may be cylinders or hollow cylinders aligned at predetermined intervals.

Referring to FIG. 1B, a light shielding member 13 includes openings 14 each of which has a center Z through which the optical axes X of corresponding microlenses pass. Thus, the center-to-center distance P between the adjacent openings 14 is equal to the center-to-center distance P between the adjacent microlenses 12 in the row. Each of the openings 14 has a dimension 2RY, smaller than P, in the longitudinal direction L of the light shielding member 13. The light shielding member 13 is formed of a black resin material that absorbs the light emitted from the LEDs 30.

Referring to FIG. 4, the lens plate 11 is held in position by press-fitting projections 15 of the lens plate 11 into corresponding mounting portions or holes 16 formed in the light shielding member 13. The light shielding member 13 is formed of a resin material, and securely holds the lens plate 11 press-fitted into the holes 16. The light shielding member 13 has a light entrance where one lens plate 11 is disposed and a light exit where another lens plate 11 is disposed. The lens plates 11 at the light entrance and light exit are positioned relative to one another such that their optical axes coincide and that the images of the LEDs 30 are formed on the photoconductive drum 41.

Referring to FIG. 5, the light shielding member 13 includes a positioning hole 18 into which a positioning projection 17 of the lens plate 11 is fitted to accurately position the lens plate 11 relative to the light shielding member 13. The lens array unit 1 is assembled to the light shielding member 13 such that the two microlenses 12 are in a back-to-back relation with one another. The two microlenses 12 at the light entrance and light exit are positioned such that each LED and the surface of the photoconductive drum 41 form a pair of conjugate points with respect to the microlenses 12. This arrangement of the two microlenses 12 provides an optical system that forms an erect image having the same size.

The light shielding member 13 serves to prevent ambient light from entering the optical system (i.e., lens array unit 1) constructed of the microlenses 12 of the light entrance and light exit, and to prevent light in the optical system from leaking outside. The lens plate 11 of the first embodiment is injection-molded from an optical resin which is a cycloolefin-based resin (ZENEX E48R(registered trademark), available from JAPAN ZENON), thereby providing a plurality of microlenses 22 in one piece construction. The light shielding member 13 is molded from polycarbonate.

The operation of the printer 100 that employs the lens array unit 1 of the aforementioned configuration will be described. The operation of the printer 100 will first be described with reference to FIG. 2. A power supply (not shown) applies a high voltage to the charging roller 42, which in turn charges the surface of the photoconductive drum 41. As the photoconductive drum 41 rotates past the LED head 3, the LED head 3 illuminates the charged surface of the photoconductive drum 41 to form an electrostatic latent image in accordance with control signals and image signals. The photoconductive drum 41 further rotates to pass the developing section where the electrostatic latent image is developed with the toner into a toner image.

The feed roller 61 feeds the top sheet of the stack of the paper 101, held in the paper cassette 60, into the transport path. The paper 101 is then further transported toward the transfer point. As the photoconductive drum 41 further rotates, the toner image approaches the transfer point defined between the photoconductive drum 41 and the transfer belt 81. The power supply (not shown) applies the voltage to the transfer roller 80 in timed relation with the approach of the toner image to the transfer point. The paper 101 then enters the transfer point where the toner image is transferred onto the paper 101.

Subsequently, the paper 101 carrying the toner image thereon is transported by the transfer belt 81 to the fixing section 9. The toner image on the paper 101 is fixed by heat and pressure. The paper 101 carrying the fixed image thereon is then discharged onto the stacker 7. This completes the operation of the printer 100. The operation of the LED head 3 will be described with reference to FIG. 3.

When the controller of the printer 100 sends the control signals to the LED head 3, the driver ICs 31 drive the LEDs to emit a controlled amount of light in accordance with the control signals and image signals. The light emitted from the LEDs 30 enters the lens array unit 1 to form images of the LEDs 30 on the surface of the photoconductive drum 41.

The operation of the lens array unit 1 will be described with reference to FIG. 4.

The light emitted from the LEDs 30 enters entrance microlens 12 disposed at the light entrance, which forms an intermediate image at a certain distance from the entrance microlens 12 such that the intermediate image is on the side of the entrance microlens 12 opposite the LEDs 30. An exit microlens 12 forms an image of the intermediate image on the photoconductive drum 41. The intermediate image is an inverted image having a reduced size. The images formed on the photoconductive drum 41 are erect images of the LEDs 30 with the same size as the LEDs 30, i.e., inverted images of the intermediate images.

The principal ray of the light from various points of an object is parallel to one another between the light entrance and the light exit, i.e., a telecentric optical system. As described above, the lens array unit 1 forms erect images of LEDs 30 having the same size as the LEDs 30. The light emitted from the LEDs 30 enters more than two microlenses in the row whose optical axes are substantially parallel to one another.

Part of the light emitted from the LEDs 30 that exits the entrance microlenses 12 does no contribute to image formation. Such a light portion is absorbed by the light shielding member 13. The lens plate 11 includes the protective projections 19 formed thereon to extend in a direction parallel to the optical axis such that the projections 19 are higher than the lens surfaces of the microlenses 12, i.e., the projections 19 extend outwardly further than the surfaces of the microlenses 12. The projections 19 prevent a user from directly touching the lens surfaces, thereby protecting the lens surfaces from scratch and dirt. The projections 19 are plate-shaped but may be cylinders or hollow cylinders aligned at predetermined intervals. The projections 19 also serve to protect the surfaces of the microlenses 12 from damage when the lens array unit 1 is assembled to the holder 34 of the LED head 3.

The provision of the projection 19 is effective in increasing the rigidity of the lens array unit 1 against a bending force, thereby minimizing deformation or warpage of the lens plate 11. While the light source of the first embodiment has been described in terms of an LED array in which a plurality of LEDs 30 are arranged, the light source may also be an optical head that employs organic electroluminescence (OEL) elements.

As described above, the lens plate of the first embodiment has an array of microlenses that includes protective projections 19. The projections 19 are formed such that the microlenses 12 are positioned between the projections 19. The projections 19 extend outwardly further than the lens surfaces of the microlenses. Thus, the projections 19 serve to reduce the chance of the lens surfaces being scratched inadvertently.

Second Embodiment

Figure 6A:
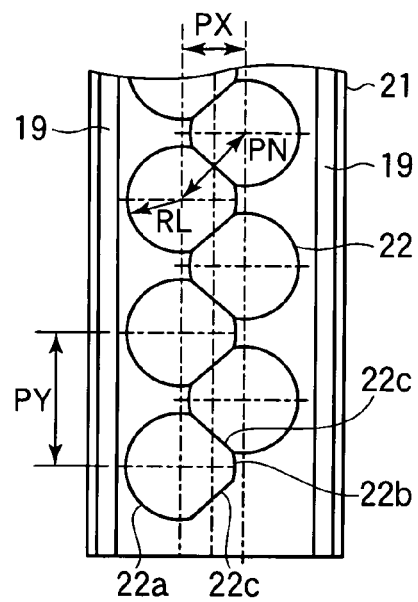
FIG. 6A is a top view illustrating the lens plate assembled to a lens array unit of a second embodiment.
Figure 6B:
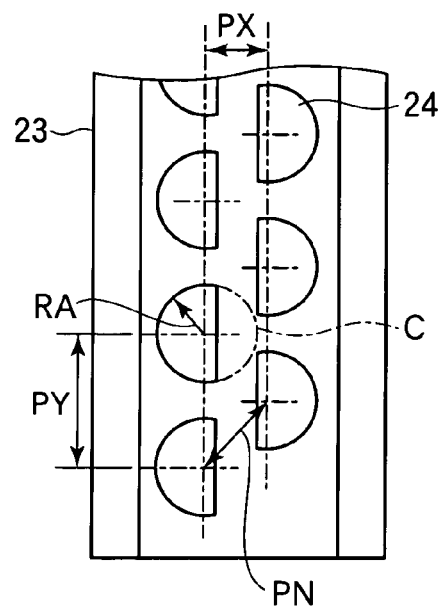
FIG. 6B is a top view illustrating a light shielding member assembled to the lens array unit of the second embodiment.

FIG. 6A is a top view illustrating a lens plate 21 used in a lens array unit 1 of a second embodiment. FIG. 6B is a top view illustrating a light shielding member 23 used in the lens array unit 1. The lens plate 21 includes two parallel rows of a plurality of microlenses 22 aligned in directions substantially perpendicular to the optical axes of the microleneses 22 such that each microlens 22 in one of the two rows is between adjacent microlenses 22 in the other. The lens plate 21 of the second embodiment is injection-molded from an optical resin which is a cycloolefin-based resin (ZENEX E48R(registered trademark), available from JAPAN ZENON), thereby providing a plurality of microlenses 22 in one piece construction.

Elements similar to those of the first embodiment have been given the same reference numerals and their detailed description is omitted.

Referring to FIG. 6A, the microlenses 22 in each row are spaced apart such that the optical axes of adjacent microlenses are spaced apart by a distance PY, and that the optical axes of the microlenses 22 lie in one of two parallel planes spaced apart by a distance PX. The lens surface of each microlens 22 includes a large partially circumferential perimeter, a small partially circumferential perimeter, and two straight perimeters. The rows of the microlenses 22 are arranged into an overlapping nested configuration in which each microlens 22 in one of the two parallel rows extends into adjacent two microlenses 22 in the other with its two straight perimeters in intimate contact with those of the adjacent two microlenses.

Just as in the first embodiment, the lens plate 21 includes projections 19 formed on the both sides of the two rows of the microlenses 22 such that the projections 19 extend outwardly in directions substantially parallel to the optical axes of the microlenses further than the convex surface of the microlenses 22.

The projections 19 prevent a user from inadvertently touching the convex lens surfaces of the microlenses 22. The projections 19 of the second embodiment are in the shape of a single plate but may be cylinders or hollow cylinders aligned at predetermined intervals. Referring to FIG. 6B, the light shielding member 23 is molded from polycarbonate, and has openings 24 having a substantially semicircular perimeter. The openings 24 in each row are spaced apart by a center-to-center distance PY. The openings 24 fit into imaginary circles C such that the optical axes of the microlenses 22 pass through the centers of corresponding imaginary circles C. The optical axes of the microlenses 22 lie in planes spaced apart by a distance PX. The imaginary circles have a radius RA smaller than that of the microlenses 22.

The lens array unit 1 is assembled in much the same way as the first embodiment. The lens plate 21 is held in position by press-fitting the projections 15 of the lens plate 21 into holes 16 formed in the light shielding member 23. The light shielding member 23 is formed of a resin material, and tightly holds the lens plates 21 after the projections of the lens plates 21 are press-fitted into the light shielding member 23. The light shielding member 23 holds the two lens plates 21, one at the entrance of the opening 24 and one at the exit, such that the optical axes of these microlenses 22 pass through the centers of the opening 24. The depth of the opening 24 is selected such that the microlenses 22 at the entrance and exit are spaced apart to form an image of the light emitting element on the photoconductive drum 41.

A printer 100, LED head 3, and lens array unit 1 operate in the same way as in the first embodiment, and therefore their description is omitted.

The provision of the projection 19 is effective in increasing the rigidity of the lens array unit 1 against a bending force, thereby minimizing deformation or warpage of the lens plate 11. The microlenses 22 arranged in two rows allow the images of the LEDs 30 to be formed on the photoconductive drum 41 with a larger, more uniform amount of light than those arranged in a single row.

The lens plate 21 of the second embodiment includes two parallel rows of microlenses 22, providing more uniform amount of light and more amount of light than those arranged in a single row.

Third Embodiment

Figure 7A:
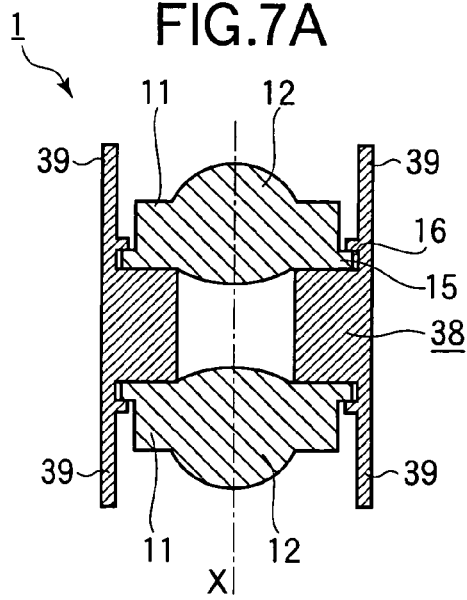
FIG. 7A is a cross-sectional view of a lens array unit of a third embodiment.
Figure 7B:
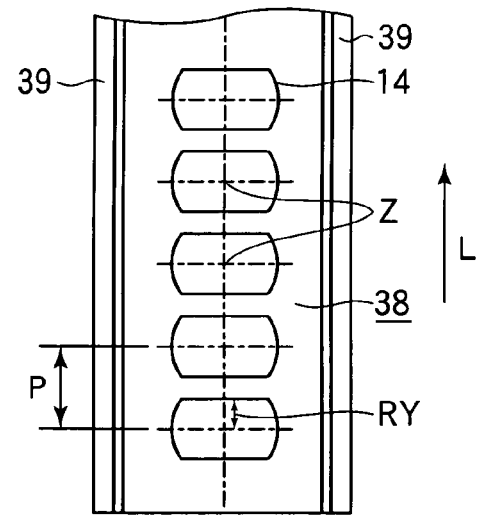
FIG. 7B is a top view of the lens array unit of the third embodiment.

FIG. 7A is a cross-sectional view of a lens array unit 1 of a third embodiment. FIG. 7B is a top view of the lens array unit of the third embodiment.

A light shielding member 38 of the third embodiment is formed in a one piece construction and has protective projections 39. Elements similar to those of the first embodiment have been given the same reference numerals and their description is omitted. Referring to FIG. 7A, a lens plate 11 is held in position by fitting the projections 15 of the lens plate 11 into holes 16 formed in the light shielding member 38. The light shielding member 38 is formed of a resin material, and tightly holds the lens plate 11 after the projections 15 of the lens plate 11 have been press-fitted into the holes 16 of the light shielding member 38.

The light shielding member 38 includes protective projections 39 formed thereon to longitudinally extend, so that when the light shielding member 38 and the lens plate 11 have been assembled together, the projections 39 are positioned on both sides of the row of microlenses 12 and extend outwardly further than the convex surfaces of the microlenses 12 in directions parallel to the optical axes of the microleses 12. The lens plate 21 of the second embodiment is injection-molded from an optical resin which is a cycloolefin-based resin (ZENEX E48R(registered trademark), available from JAPAN ZENON), thereby providing a plurality of microlenses 22 in one piece construction. Thus, the projections 39 protect the convex surfaces of the microlenses 12 from scratch. The projections 19 are each in the shape of a single plate but maybe cylinders or hollow cylinders aligned at predetermined intervals.

The light shielding member 38 holds the two lens plates 11 press-fitted thereto, one at the light entrance of the opening 14 and one at the light exit, such that the optical axes of the microlenses 12 coincide and pass through corresponding centers of the openings 14. The depth of the opening 14 is selected such that the two microlenses 22 are spaced apart to accurately form the image of the light emitting elements on a photoconductive drum 41.

A printer 100, LED head 3, and lens unit 1 operate in the same way as in the first embodiment, and therefore their description is omitted. The projections 39 prevent a user from inadvertently touching the surfaces of the microlenses 12. The projections 39 also serve to protect the surfaces of the microlenses 12 against damage or dirt.

As described above, the microlenses 12 are protected from inadvertent dirt and scratch by providing the protective projections 39 on the light shielding member 38. The protective projections 39 extend in the directions substantially parallel to the optical axes of the microlenses 12 further than the lens surfaces of the microlenses 12, being on both sides of the row of the microlenses 12.

While the optical heads of the first to third embodiments have been described in terms of an LED head, the optical heads may also be applied to OCRs. The optical heads may also be applied to information apparatuses such as copying machines and multi function apparatuses.

The invention being thus described, it will be obvious that the same may be varied in many ways: Such variations are not to be regarded as a departure from the spirit and scope of the invention, and all such modifications as would be obvious to one skilled in the art intended to be included within the scope of the following claims.

What is claimed is:

1. A lens array unit, comprising:
a longitudinally extending lens plate including a lens array, the lens array including a plurality of lenses that are aligned generally in a direction in which the lens plate extends and that have lens surfaces, and optical axes passing through the lens surfaces in directions substantially perpendicular to the direction,
each of the lens surfaces having an outer perimeter that includes a circumferential perimeter and straight perimeter portions such that adjacent lenses are contiguous to and in contact with each other at one of the straight perimeter portions; and
at least two projections formed on the lens plate and aligned in a direction traverse to the lens array such that the lens array extends through an area between the at least two projections, the at least two projections protecting the lens surfaces of the plurality of lenses,
wherein the at least two projections are in areas outside an area in which the lens array extends, the area being between two planes parallel to the optical axes.

2. The lens array unit according to claim 1 further comprising a light shielding member, wherein the light shielding member includes a mounting portion that holds the lens plate and a light shielding portion that shields part of light passing through the lenses and includes the at least two projections formed thereon.

3. The lens array unit according to claim 1, wherein the at least two projections extend further outwardly than the lens surfaces in directions substantially parallel to the optical axes.

4. The lens array unit according to claim 1, wherein the at least two projections extend further outwardly than the lens surfaces in directions substantially perpendicular to the optical axes.

5. The lens array unit according to claim 2, wherein the at least two projections extend further outwardly than the lens surfaces in directions substantially perpendicular to the optical axes.

6. An optical head incorporating the lens array unit according to claim 1.

7. An optical head incorporating the lens array unit according to claim 2.

8. An optical head incorporating the lens array unit according to claim 3.

9. An information apparatus incorporating the optical head according to claim 6.

10. An information apparatus incorporating the optical head according to claim 7.

11. An information apparatus incorporating the optical head according to claim 8.

12. The lens array unit according to claim 1, wherein the at least two projections are walls extending in a direction substantially perpendicular to the optical axes.

13. The lens array unit according to claim 1, wherein the at least two projections are part of cylinders aligned at predetermined intervals in a direction substantially perpendicular to the optical axes.

14. The lens array unit according to claim 1, wherein the at least two projections are part of hollow cylinders aligned at predetermined intervals in a direction substantially perpendicular to the optical axes.

15. The lens array unit according to claim 2, wherein the light shielding member includes a positioning hole and the lens plate includes a positioning projection, and wherein the positioning projection fits into the positioning hole.

16. The lens array unit according to claim 1, wherein the lens plate includes the at least one projection formed thereon.

17. The lens array unit according to claim 1, wherein the plurality of lenses are aligned in a single row.

18. The lens array unit according to claim 1, wherein the outer perimeter of each of the lens surfaces is partially cut in a plane parallel to the optical axes to form the straight perimeter portions, such that the adjacent lenses are contiguous with each other at one of the straight perimeter portions cut in the plane.

19. A lens array unit, comprising:
a longitudinally extending lens plate including a lens array, the lens array including a plurality of lenses that are aligned generally in a direction in which the lens plate extends and that have lens surfaces, and optical axes passing through the lens surfaces in directions substantially perpendicular to the direction,
each of the lens surfaces having a circumferential perimeter with straight perimeter portions such that adjacent lenses are contiguous to each other at one of the straight perimeter portions; and
at least two projections formed on the lens plate and aligned in a direction traverse to the lens array such that the lens array extends through an area between the at least two projections, the at least two projections protecting the lens surfaces of the plurality of lenses,
wherein the plurality of lenses are aligned in two substantially straight rows extending along the direction such that the two rows of lenses are disposed in an overlapping nested configuration in which each lens in one of the two rows extends into a gap between two adjacent lenses in the other of the two rows.

20. A lens array unit, comprising:
at least two longitudinally extending lens plates each including a lens array, each lens array including a plurality of lenses that are aligned generally in a first direction in which the lens plate extends and that have lens surfaces and optical axes passing through the lens surfaces in second directions substantially perpendicular to the first direction, each of the lens surfaces having an outer perimeter that includes a circumferential perimeter and straight perimeter portions such that the adjacent lenses are contiguous to and in contact with each other at one of the straight perimeter portions; and
a light shielding member that supports the at least two lens plates such that the at least two lens plates are spaced apart from each other,
wherein the light shielding member includes a portion located between the at least two lens plates such that the lenses of one of the at least two lens plates and the lenses of the other of the at least two lens plates are spaced apart by the portion, the portion including a plurality of openings formed therein such that light exiting a lens of one of the at least two lens plates passes through one of the openings to enter a corresponding lens of the other of the at least two lens plates, and
wherein the light shielding member includes projections that extend substantially parallel to the first direction such that one of the at least two lens plates lies between adjacent projections, the projections also extending substantially parallel to the optical axes of the lenses further than the lens surfaces.

* * * * *